June 30, 1931.  J. D. PEACE, JR  1,812,549
INDICATING INSTRUMENT
Filed Sept. 6, 1929
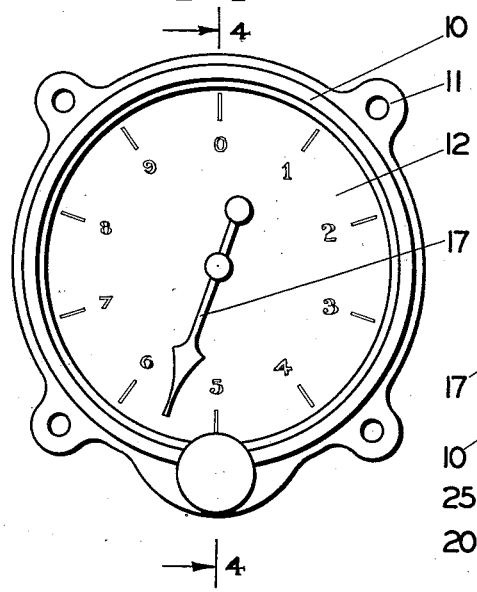
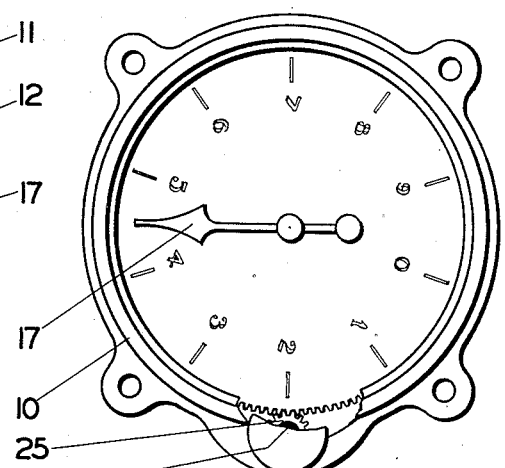
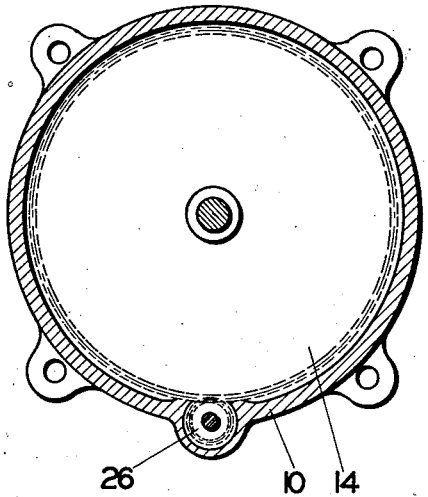
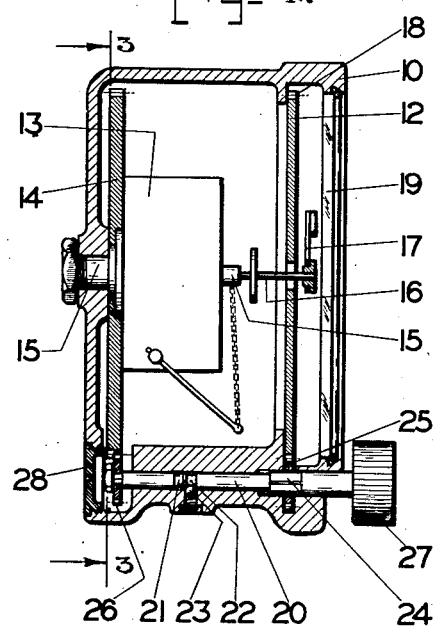
INVENTOR.
BY John D. Peace, Jr.
Cooper, Kerr & Dunham
ATTORNEYS.

Patented June 30, 1931

1,812,549

UNITED STATES PATENT OFFICE

JOHN D. PEACE, JR., OF FLUSHING, NEW YORK, ASSIGNOR TO PIONEER INSTRUMENT COMPANY, INCORPORATED, OF BROOKLYN, NEW YORK, A CORPORATION OF NEW YORK

INDICATING INSTRUMENT

REISSUED

Application filed September 6, 1929. Serial No. 390,708.

This invention relates to indicating instruments and to means enabling adjustment of the positions of the operating mechanism of such an instrument and/or the position of the dial of the instrument in respect to the instrument casing or panel upon which it is mounted.

Among the objects of the invention is to provide an indicating instrument capable of being adjusted to a position which bears a definite relation to a condition desired to be maintained when said instrument is indicating a performance contributing to a factor in the maintenance of such condition.

An object of the invention is to provide an arrangement whereby the dial of an indicating instrument and the operating mechanism thereof may be displaced, either individually or in conjunction with each other, from a fixed position in relation to an instrument mounting or instrument board.

Other objects and uses of the invention will appear from a detailed description of the same, which consists in the features of construction and combinations of parts hereinafter described and claimed.

In the drawings, Fig. 1 is a general view of the face of an indicating instrument of the present invention without adjustment.

Fig. 2 is a face view of the instrument of Fig. 1 with the dial and operating mechanism adjusted to positions which bear definite relation to existing conditions desired to be maintained during flight.

Fig. 3 is a section on line 3—3 of Fig. 1.

Fig. 4 is a section on line 4—4 of Fig. 1.

The indicating instrument illustrated in the drawings is intended to represent any kind of an indicating instrument with which my invention, in whole or in part, may be utilized. Some of such instruments are altimeters, air-speed indicators, tachometers, rate of climb instruments and the like and for convenience and in the interest of perspicuity I shall explain the advantages of my invention in connection with an instrument for indicating altitude of aircraft.

Having reference to the drawings, 10 is a casing such as is commonly provided for housing the operating mechanism of instruments. It may be provided with lugs 11 whereby it may be secured to a panel or instrument board (not shown). For aircraft use the instrument board is usually in a substantially vertical position with the face of the dial 12 parallel to the board. It is common practice in many instances to place such an instrument so that the zero indication of the dial is uppermost as illustrated in Fig. 1.

Assuming the instrument to be an altimeter with its dial graduated in thousands of feet and standard atmospheric conditions prevail, the instrument in Fig. 1 is indicating an altitude of 5,500 feet above sea level. This information is useful, but if a pilot intends to land on a field having an elevation of one thousand feet above sea level and/or he must always be above one thousand feet to clear all ground between the station of departure and the station of destination, he must continually keep in mind that there is a safety level below which he must not descend. He might at times observe that his altimeter reads two thousand feet, but a mental computation would be necessary to determine that he is too close to his lower limit for safe flight. With an instrument adjustable to indicate actual elevation above the elevation of the landing field and/or above the highest elevation of ground to be flown over, merely a quick glance at the altimeter would at once reveal the true height above "ground" elevation.

Laws for flying in the same and in different States frequently require that a minimum altitude be maintained over certain sections and cities with the result that for commercial craft flying a long distance between cities there is a height below which a craft may not fly.

If such a height be assumed to be five thousand five hundred feet above sea level, an ordinary form of altimeter would give an indication of five thousand five hundred feet and would appear to a pilot as illustrated in Fig. 1 with the needle pointing downward. Other than the figure actually indicated, the position of the needle bears no relation to the altitude desired to be maintained.

My invention involves means whereby the indicating instrument may be adjusted to a position in which the needle bears a definite relation to a condition desired to be maintained. I accomplish this result by enabling the relation of the indicating instrument to be adjusted in respect to the instrument mounting or instrument board. For example, in the case of a certain type of aircraft, the effects of a law might be that between two cities aircraft must maintain an elevation of five thousand five hundred feet above sea level. In order to enable a level flight of five thousand five hundred feet above sea level to be maintained, I provide means whereby the operating mechanism of the altimeter may be rotated so that when an altitude above sea level of five thousand five hundred feet prevails, the needle is in a horizontal position.

Also, so that a pilot may know exactly what height he is above a minimum altitude below which he may not descend, I provide means enabling the dial of the instrument to be rotated independently of the housing and operating mechanism. Hence, when a craft is at an elevation of five thousand five hundred feet above sea level, and an adjustment of the dial has been made to provide for an elevation of the landing field of one thousand feet above sea level, the altimeter will indicate four thousand five hundred feet, as illustrated in Fig. 2. Under these conditions the indicating needle is horizontal and when the craft starts to depart in ascension the needle immediately rises and when the craft starts to descend, the indicating needle depresses. Hence, the position of the needle bears a definite relation to the altitude desired to be maintained and variance from such altitude is immediately noticeable by a movement of the needle in the direction in which the variance occurs. It is important to maintain a uniform level during a flight so as to obviate loss of power and of time which attend frequent climbs.

Obviously, an instrument embodying my invention is capable of being used on different types of aircraft and for flying over different portions of a country, since the operating mechanism and dial may be adjusted so that when the needle of the instrument is in a certain position it will bear a definite relation to a condition desired to be maintained.

Again referring to the drawings, Fig. 4, 13 indicates the operating mechanism of any instrument, such as an altimeter. The operating mechanism is conveniently mounted for rotation on a gear 14 and shaft 15. The operating mechanism 13, gear 14 and shaft 15 are mounted for rotation within casing 10 and a staff 16 extending from the operating mechanism and shaft 15 supports needle 17. This needle is disposed within casing 10 and between gear 18 and glass 19 of the housing. The scale comprising the graduations of the instrument is imprinted or impressed or otherwise fixed to the forward side of gear 18 and constitutes the dial 12.

In the lower portion of housing 10 there is mounted a shaft 20 which may be shifted axially of itself to assume either one of two positions. Grooves 21, 22 are provided for defining such positions and they are individually engageable with a spring pressed ball 23 adapted to engage either one of the grooves 21, 22. The shaft 20 has a squared portion 24 slidably engaging with a pinion 25 mounted in rotation thereon. Pinion 25 always engages gear 18 and shaft 20 may be displaced in an axial direction without affecting the meshed relation of the pinion and gear. Upon the rear end of shaft 20 there is mounted a pinion 26 adapted to be engaged with or disengaged from gear 14 depending upon the axial position of shaft 20. As illustrated in Fig. 4, pinion 26 and gear 14 are enmeshed and the operating mechanism 13 of the instrument may be rotated by rotary manipulation of knob 27. When in a forward position spring pressed ball 23 will engage with groove 21 and thereby indicate that pinion 26 is out of meshing relation with gear 14. The rotation of shaft 20 in this position enables dial 12 to be rotated relative to the operating mechanism 13. A screw-cap 28 is provided in the rear of housing 10 to facilitate access to pinion 26.

In order to adjust the instrument illustrated in Fig. 1 so as to enable the needle to bear a definite relation to a height desired to be maintained when the instrument is indicating an altitude desired to be maintained, such as for example four thousand five hundred feet above a landing field, which is one thousand feet above sea level, the knob 27 may be pulled forwardly from the instrument so as to disengage pinion 26 from gear 14 and then rotated until dial 12 has been rotated clockwise (Fig. 1) an amount equivalent to one thousand feet. Knob 27 is then pressed backward toward the instrument so as to engage pinion 26 with gear 14. The operating mechanism and dial are then rotated together until the four thousand five hundred feet graduation upon the dial is in a horizontal position, as illustrated in Fig. 2. When the pilot has taken a ship aloft to an elevation of five thousand five hundred feet above sea level, the needle of his instrument will be in a horizontal position and there indicate four thousand five hundred feet above the level below which he may not descend—that is the level of the landing field. Any deviation from a level flight will be immediately noticeable by the movement of the needle in the direction in which the deviation takes place.

The advantages of the invention for use with other instruments, for example, such as air speed indicators, is apparent from the foregoing. Different aircrafts have different cruising speeds. Accordingly, for an air-speed indicator, the operating mechanism and dial thereof may be rotated together to a position in which the cruising speed on the dial is in a horizontal position. Accordingly, when the needle of that instrument assumes a horizontal position the pilot immediately knows that his ship is traveling at the desired cruising speed. Hence, here again he has an instrument, the needle of which bears a definite relation to the speed desired to be maintained. If he should observe that the needle of his air-speed indicator is depressing in response to an increase in speed, he would be immediately aware that the speed of his craft has increased beyond the best cruising speed and that possibly his craft is descending. Hence, a deviation upwardly of the indicating needle of an air-speed indicator might indicate decrease in air-speed because the aircraft is climbing from the horizontal level of flight desired to be maintained and a deviation downwardly from the horizontal position might indicate increase in air-speed because the aircraft is descending from the horizontal level of flight desired to be maintained. Air-speed is a factor contributing to the maintenance of a cruising speed and hence of level flight, and it is therefore advantageous to have the position of the needle indicating cruising speed in a horizontal position so that the advantages above outlined may be availed of.

It is believed that the two applications of my invention referred to in detail herein in connection with a form of means adapted for controlling the position of a dial and operating mechanism of an instrument is sufficient to enable others to utilize the invention in conection with other instruments. I am aware that the invention is capable of wide variation and relation of parts without departure from the nature and principle thereof, and I do not restrict myself unessentially in the foregoing or other particulars, but contemplate such alterations and modifications within the scope of the appended claims as may be found desirable.

I claim:

1. The combination with an indicating instrument having a casing, operating mechanism, a needle actuated thereby, and a dial, of common means for displacing said operating mechanism and said dial relative to said casing.

2. The combination with an indicating instrument having a casing, operating mechanism, a needle actuated thereby, and a dial, of common means for displacing said operating mechanism and said dial relative to each other and relative to said casing.

3. The combination with an indicating instrument having a casing, operating mechanism, a needle actuated thereby, and a dial, of means rotatively mounting said operating mechanism and needle for unitary displacement relative to said casing, means rotatively supporting said dial relative to said first named means, and means having connection with said first and second named means whereby said operating mechanism and said dial may be rotated at will relative to said casing.

4. The combination with an indicating instrument having a casing, operating mechanism, a needle actuated thereby, and a dial, of means rotatively mounting said operating mechanism and needle for unitary displacement relative to said casing, means rotatively supporting said dial relative to said first named means, and means comprising an axially movable and rotatable shaft operable to rotate either said operating mechanism or said dial or both at will.

5. The combination with an indicating instrument having a casing, indicating means and operating mechanism therefor, and a dial, of means mounting said indicating means and operating mechanism therefor for unitary displacement relative to said casing, means supporting said dial for movement relative to said casing, a rotatable and axially movable shaft, and means operated by said shaft for moving, as the shaft is rotated, either said indicating means and operating mechanism therefor and said dial together, or one of said units alone, depending upon the axial position of the shaft.

6. The combination with an indicating instrument having a casing, indicating means and operating mechanism therefor, and a dial, of means for displacing, at will, said operating mechanism and said dial concomitantly, or said dial alone, in respect to the casing.

7. The combination with an indicating instrument having a casing, indicating means and operating mechanism therefor, and a dial, of manipulative means for displacing said dial relative to the casing, and means controlled by said manipulative means for positioning the indicating means and operating mechanism therefor so that when the indicating means is in a certain position it will be in a definite relation to a condition desired to be maintained.

8. The combination with an indicating instrument having a casing, indicating means and operating mechanism therefor, and a dial, of manipulative means for displacing said indicating means and operating mechanism therefor, and means under the control of said manipulative means for enabling displacement of said dial, either independently of or together with said indicating means and operating mechanism therefor.

9. The combination with an instrument having a casing, operating mechanism, a pointer actuated thereby, and a dial, of means for displacing said operating mechanism relative to said casing, means for displacing said dial relative to said casing, and common means for actuating said first and second mentioned means.

10. The combination with an instrument having a casing, operating mechanism, a pointer actuated thereby, and a dial, of means for displacing said operating mechanism relative to said casing, means for displacing said dial relative to said casing, and common means for actuating said first and second mentioned means and arranged so that said dial and operating mechanism may be displaced simultaneously or independently relative to said casing.

In testimony whereof I hereto affix my signature.

JOHN D. PEACE, Jr.